(12) United States Patent
Raffaelli

(10) Patent No.: US 11,952,076 B2
(45) Date of Patent: Apr. 9, 2024

(54) THREE-WHEELED TILTING VEHICLE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 17/776,914

(22) PCT Filed: Nov. 11, 2020

(86) PCT No.: PCT/IB2020/060607
§ 371 (c)(1),
(2) Date: May 13, 2022

(87) PCT Pub. No.: WO2021/094940
PCT Pub. Date: May 20, 2021

(65) Prior Publication Data
US 2022/0402569 A1    Dec. 22, 2022

(30) Foreign Application Priority Data

Nov. 15, 2019   (IT) .......................... 102019000021255

(51) Int. Cl.
| | |
|---|---|
| *B62K 5/10* | (2013.01) |
| *B62J 25/04* | (2020.01) |
| *B62K 5/027* | (2013.01) |
| *B62K 5/05* | (2013.01) |
| *B62K 21/12* | (2006.01) |

(52) U.S. Cl.
CPC ................ *B62K 5/10* (2013.01); *B62J 25/04* (2020.02); *B62K 5/027* (2013.01); *B62K 5/05* (2013.01); *B62K 21/12* (2013.01)

(58) Field of Classification Search
CPC . B62K 5/027; B62K 5/05; B62K 5/10; B62K 21/12; B62J 25/04
See application file for complete search history.

(56) References Cited

U.S. PATENT DOCUMENTS

| | | | | |
|---|---|---|---|---|
| 3,746,118 | A * | 7/1973 | Altorfer ............... | B62D 61/065 280/267 |
| 4,020,914 | A * | 5/1977 | Trautwein ............ | B60G 21/007 280/267 |
| 4,088,199 | A * | 5/1978 | Trautwein ............. | B62K 11/00 180/41 |
| 6,763,905 | B2 * | 7/2004 | Cocco ..................... | B62K 5/10 180/210 |
| 7,637,338 | B2 * | 12/2009 | Maltais .................... | B62J 25/04 180/215 |

(Continued)

FOREIGN PATENT DOCUMENTS

| | | |
|---|---|---|
| CN | 205769836 U | 12/2016 |
| DE | 3546073 A1 | 7/1987 |

(Continued)

*Primary Examiner* — Laura Freedman
(74) *Attorney, Agent, or Firm* — McGlew and Tuttle, P.C.

(57) ABSTRACT

There is described a three-wheeled vehicle (1) with two front steered wheels and two footboards (41.1, 41.2) on which the driver stands to drive the vehicle. The footboards are supported on a tilting four-bar linkage, having a front crosspiece 27 and a rear crosspiece 33, between which two rocker arms 31.1 and 31.2 extend. The front steered wheels are supported by the rocker arms and rotate around steering axes (S.1, S.2).

11 Claims, 12 Drawing Sheets

(56) References Cited

U.S. PATENT DOCUMENTS

| | | | | |
|---|---|---|---|---|
| 7,669,864 | B2* | 3/2010 | Rawlinson | B60G 21/007 |
| | | | | 180/311 |
| 7,803,090 | B2* | 9/2010 | Kraus | B62K 3/002 |
| | | | | 280/224 |
| 8,251,375 | B2* | 8/2012 | Hara | B62K 5/01 |
| | | | | 280/5.509 |
| 10,421,515 | B2* | 9/2019 | Koo | B62K 13/04 |
| 10,894,456 | B2* | 1/2021 | Abramov | B62K 5/10 |
| 10,906,602 | B2* | 2/2021 | Laberge | B60K 5/02 |
| 11,034,409 | B2* | 6/2021 | Hebert | B62K 19/30 |
| 11,046,363 | B2* | 6/2021 | Raffaelli | B62K 5/08 |
| 11,072,389 | B2* | 7/2021 | Doerksen | B62K 5/06 |
| 11,130,541 | B2* | 9/2021 | Nagasaka | B62K 5/027 |
| 11,136,087 | B2* | 10/2021 | Takimoto | B62K 5/08 |
| 11,230,339 | B2* | 1/2022 | Raffaelli | B62K 5/027 |
| 11,358,672 | B2* | 6/2022 | Raffaelli | B62K 5/08 |
| 11,691,689 | B2* | 7/2023 | Kurakake | B62K 5/06 |
| | | | | 280/124.103 |
| 2006/0054370 | A1* | 3/2006 | Sugioka | B62D 61/065 |
| | | | | 180/211 |
| 2010/0133772 | A1* | 6/2010 | Marabese | B62K 5/01 |
| | | | | 280/124.103 |
| 2011/0233885 | A1 | 9/2011 | McMillan | |
| 2012/0258840 | A1* | 10/2012 | Eisenberg | A63B 22/20 |
| | | | | 482/57 |
| 2021/0269115 | A1* | 9/2021 | Shintani | B62K 5/06 |
| 2021/0284272 | A1* | 9/2021 | Kurakake | B62K 5/10 |
| 2021/0394857 | A1* | 12/2021 | Raffaelli | B62K 5/10 |
| 2022/0119069 | A1* | 4/2022 | Kurakake | B62J 50/26 |

FOREIGN PATENT DOCUMENTS

| | | |
|---|---|---|
| DE | 102012003894 A1 | 8/2013 |
| DE | 102015004977 A1 | 10/2016 |
| GB | 1561253 A | 2/1980 |
| JP | S53104938 A | 9/1978 |
| WO | 2018216727 A1 | 11/2018 |
| WO | WO-2022238855 A1 * | 11/2022 |

* cited by examiner

THREE-WHEELED TILTING VEHICLE

TECHNICAL FIELD

The present invention relates to a motor vehicle, in particular a motor vehicle useful in urban transport. Specifically, embodiments disclosed herein concern an electric scooter with two front steered wheels.

BACKGROUND ART

The increasing need for practical and lightweight means of transport, in particular for urban use, has led to the development of a wide range of different types of lightweight and easy to handle vehicles. Recently, both two-wheeled and three-wheeled motorized scooters have been developed, in particular with electric motors. Three-wheeled scooters are vehicles that are particularly easy to handle. The use of electric motors makes these vehicles advantageous also from the viewpoint of environmental impact.

WO-A-2018/216727 discloses a three-wheeled electric scooter, with a rear driving wheel and two front steered wheels. To increase driving comfort the scooter disclosed in WO-A-2018/216727 is configured as a tilting vehicle, i.e., capable of leaning to the right and to the left with respect to a vertical median plane of the vehicle, for example on a bend. For this purpose, the two front steered wheels are connected to the frame of the vehicle by means of a four-bar linkage. This latter comprises a first front crosspiece and a second front crosspiece, centrally hinged to the frame of the vehicle and more precisely to the front part thereof. The two crosspieces form the connecting rods of the four-bar linkage. The two crosspieces are arranged one above the other and extend in a right-left direction of the vehicle. The two crosspieces are connected to each other by two uprights, respectively right and left. The two uprights form two rocker arms of the four-bar linkage. The uprights support the two front steered wheels, with respective steering axes parallel to the uprights. During travel, the vehicle can tilt, for example on a bend. The tilt (roll) movement, which allows the vehicle to tilt around a horizontal axis lying in the median plane of the vehicle and passing through the contact point between ground and rear wheel, is obtained with a deformation of the four-bar linkage.

Two supporting footboards are provided for driving the vehicle and controlling the tilting movements thereof. The driver drives the vehicle standing on the two footboards and holding the handlebar. The footboards are rigidly connected to the two uprights and hence, during the tilting movement, maintain a constant angle with respect to the frame of the vehicle. To support the footboards with respect to the frame of the vehicle there is provided a tilting rear bar, centrally hinged to the back portion of the frame of the vehicle, close to the rear driving wheel and having two lateral ends, respectively right and left, to which the footboards are hinged.

The structure obtained is complex and costly, a drawback in this type of vehicle for which it is preferable to reduce number of components, weight and cost, in order to make it easier to handle. Moreover, the prior art three-wheeled tilting scooter has a series of structural limits that, for example, make it necessary to use wheels with a small diameter. These do not promote comfortable driving and stability of the vehicle.

A motorized three-wheeled vehicle is illustrated in GB1561253. This vehicle comprises a frame, one rear driving wheel and two steered front driving wheels. The front driving wheels are carried by a tilting four-bar linkage, which has a first front crosspiece and a second front crosspiece, positioned under the first front crosspiece. The first front crosspiece and the second front crosspiece are centrally hinged to the frame and connected to each other by a left rocker arm and by a right rocker arm. The two rocker arms are each constrained with two end hinges to corresponding two ends of the first front crosspiece and of the second front crosspiece. Moreover, two footboards are rigidly connected to the second front crosspiece positioned under the first front crosspiece; these footboards are in turn hinged at the rear to a rear crosspiece centrally hinged to the frame in proximity of the rear driving wheel.

CN205769836U discloses a motorized three-wheeled vehicle, with a frame, a rear driving wheel and two steered front driving wheels. The front driving wheels are carried by a tilting four-bar linkage, comprising a first front crosspiece, a second front crosspiece and two rocker arms that connect the first front crosspiece and the second front crosspiece. The first front crosspiece is located above the second front crosspiece. The two front steered wheels are supported by the two rocker arms of the tilting four-bar linkage. The second front crosspiece, placed in a lower position, forms a rectangular frame together with two longitudinal beams extending in a front-rear direction. Each beam is rigidly connected with a front end thereof to the second front crosspiece and is moreover rigidly connected with a rear end thereof to a rear crossbeam. The rear crossbeam is hinged at its center to the frame of the vehicle in the vicinity of the rear driving wheel. The rear crossbeam, the longitudinal beams and the second front crosspiece in substance form a rigid rectangular frame. Footboards which support the feet are rigidly connected to the longitudinal beams.

The prior art vehicles described above are characterized by a complex configuration, which requires a large number of components and are consequently cumbersome, heavy and expensive.

Therefore, there is a need to improve three-wheeled tilting vehicles, in particular of the scooter type, i.e., designed to be driven standing, in order to overcome completely or partly one or more of the drawbacks of prior art vehicles.

SUMMARY OF THE INVENTION

Disclosed herein is a three-wheeled tilting vehicle, in particular of scooter type, adapted to be driven while standing on specific footboards, with structure which is simpler and less costly than that of the prior art vehicles mentioned above. The vehicle comprises a frame, on which a rear driving wheel and two front steered wheels are supported. Moreover, two footboards are constrained to the frame to allow the driver to drive the vehicle while standing. The vehicle comprises a tilting four-bar linkage. Said tilting four-bar linkage is formed by: a left rocker arm; a right rocker arm; a single front crosspiece, which extends in a left-right direction of the vehicle, centrally hinged to the frame, and having a left end hinged to the left rocker arm and a right end hinged to the right rocker arm; and a rear crosspiece, centrally hinged to the frame.

More specifically, the left end of the front crosspiece is hinged directly to the left rocker arm, in particular with a first left hinge that connects the left end of the front crosspiece and the left rocker arm to each other. Moreover, the right end of the front crosspiece is hinged directly to the right rocker arm, in particular with a first right hinge that connects the right end of the front crosspiece and the right rocker arm to each other.

The rocker arms are connected directly to the rear crosspiece, for example by means of a second left hinge and a second right hinge, which connect directly to each other: the left rocker arm to the left end of the rear crosspiece and the right rocker arm to the right end of the rear crosspiece.

Advantageously, the hinges that connect the components of the tilting four-bar linkage (i.e., the left rocker arm, the right rocker arm, the front crosspiece and the rear crosspiece) to each other have hinge axes substantially parallel to each other.

The left and right front steered wheels are supported respectively by the left rocker arm and by the right rocker arm of the tilting four-bar linkage, and are adapted to rotate each around a respective steering axis. Moreover, the vehicle comprises a left footboard supported by the rear crosspiece and by the left rocker arm, and a right footboard supported by the rear crosspiece and by the right rocker arm. The two footboards form supports that allow the driver to drive while standing on the footboards.

Contrary to prior art vehicles, the tilting four-bar linkage has a single front crosspiece, which forms the first connecting rod of the four-bar linkage. The second connecting rod of the four-bar linkage is formed by the rear crosspiece which, together with the rocker arms, supports the two footboards which support the driver's feet.

The tilting four-bar linkage is therefore positioned in the lower part of the vehicle.

The tilting four-bar linkage extends in a front-rear direction rather than in a vertical direction, as in prior art vehicles. The four-bar linkage uses as connecting rod (besides the front crosspiece hinged to the front portion of the frame of the vehicle) the crosspiece that forms the tilting rear support of the footboards and which is hinged to the frame in the lower area of the vehicle, behind the handlebar and the steering column, in the vicinity of the rear driving wheel.

The resulting structure is substantially simpler than that of existing vehicles, lighter and easier to handle, and has a lower cost.

In the present description and in the appended claims "right" and "left" are meant as the right side and the left side of the vehicle with respect to a driver in the driving position on the vehicle.

In a possible embodiment, the left footboard and the right footboard are positioned in an intermediate position between the front crosspiece and the rear crosspiece. For example, the left footboard can be rigidly fixed to the left rocker arm and the right footboard can be rigidly fixed to the right rocker arm.

In another embodiment, the left footboard and the right footboard can be rigidly connected to the rear crosspiece. For example, the left and right footboards can be arranged behind the rear crosspiece with respect to a front-rear direction of the vehicle.

In possible advantageous embodiments, a left bar supporting the driver's left leg is rigidly connected to the left footboard, and a right bar supporting the driver's right leg is rigidly connected to the right footboard. The support bars can be sized so as to form a support for the driver's calf area. For example, the left support bar and the right support bar can be arranged at a higher level than the respective left footboard and right footboard and can be positioned closer to the median plane of the vehicle than the respective footboards, i.e., closer to the vertical plane of symmetry extending in front-rear direction of the vehicle.

In practice, the two crosspieces of the four-bar linkage, i.e., the components that form the connecting rods of the four-bar linkage, are positioned in a low area of the vehicle.

In possible embodiments, the front crosspiece can be positioned in an intermediate position between the two front steered wheels, at a distance from the support surface of the vehicle less than the diameter of the front steered wheels. In substance, the front crosspiece of the tilting four-bar linkage can be positioned inside the volume delimited between the two front steered wheels, rather than at a higher level than the front steered wheels, as occurs in the prior art vehicles mentioned above. Therefore, the front crosspiece can be hinged to the frame of the vehicle around an axis placed at a height smaller than the diameter of the left front steered wheel and of the right front steered wheel.

As there is only a single front crosspiece of the four-bar linkage, it is possible to use wheels of larger diameter than those used in currently known vehicles of the same kind. This increases driving stability, safety of the vehicle and comfort.

The second crosspiece, forming the second connecting rod of the four-bar linkage, can be in a position farther back and lower than the front crosspiece. Its pivot axis to the frame of the vehicle can be positioned in the lowest area of the frame.

The linkage connecting the steering column to the front steered wheels can comprise a steering bar positioned behind a rotation axis of the steering column, with respect to the forward direction of travel of the vehicle.

Further advantageous features of vehicles according to the present invention are described below and defined in the appended claims.

BRIEF DESCRIPTION OF THE DRAWINGS

The invention will be better understood by following the description and accompanying drawings, which illustrate non-limiting exemplary embodiments of the invention. More in particular, in the drawing.

DETAILED DESCRIPTION OF AN EMBODIMENT

A first embodiment of a tilting three-wheeled vehicle, in the form of a scooter, is illustrated in FIGS. 1 to 7.

Figure 1:
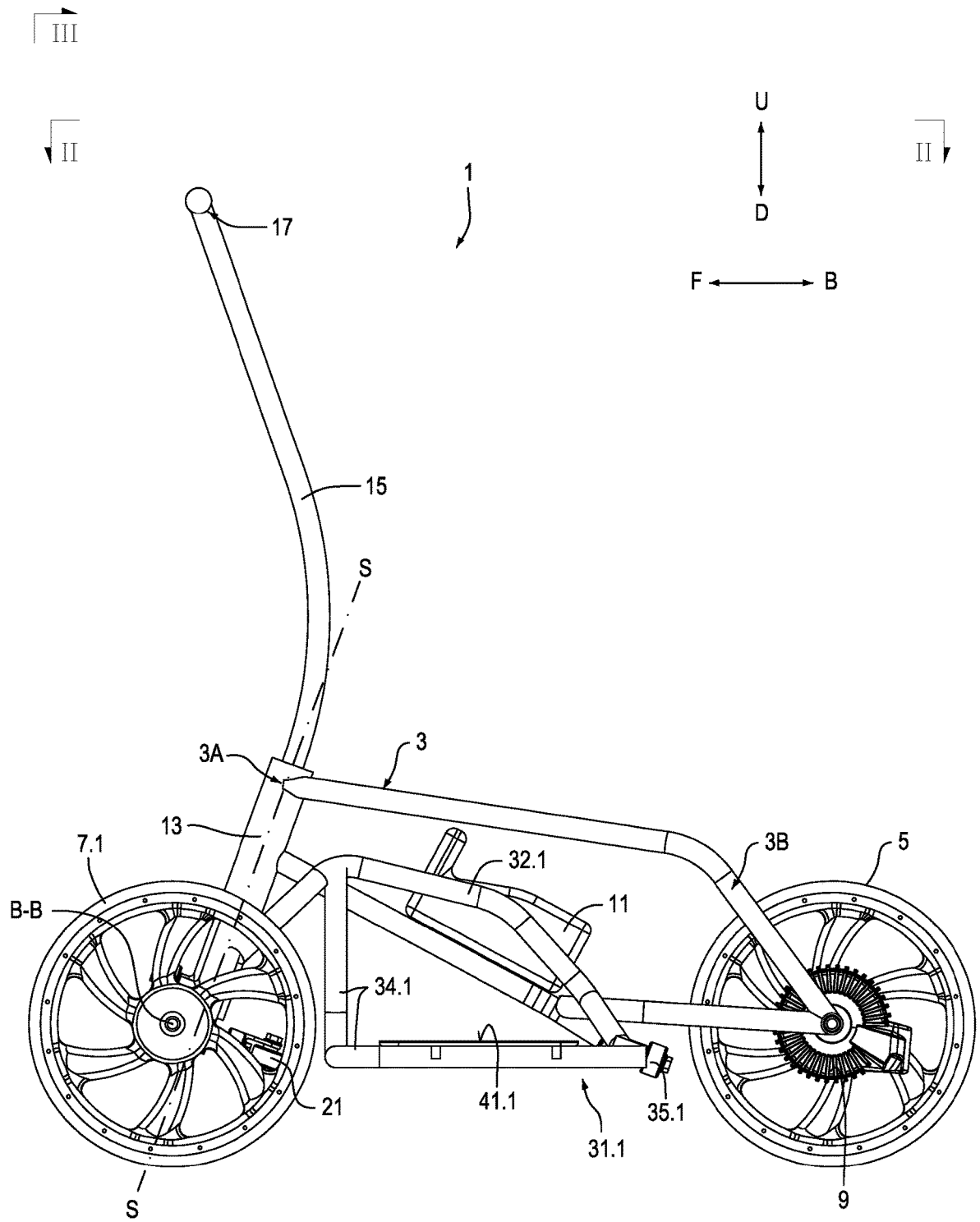
FIG. 1 shows a schematic side view of a vehicle in a first embodiment.
Figure 2:
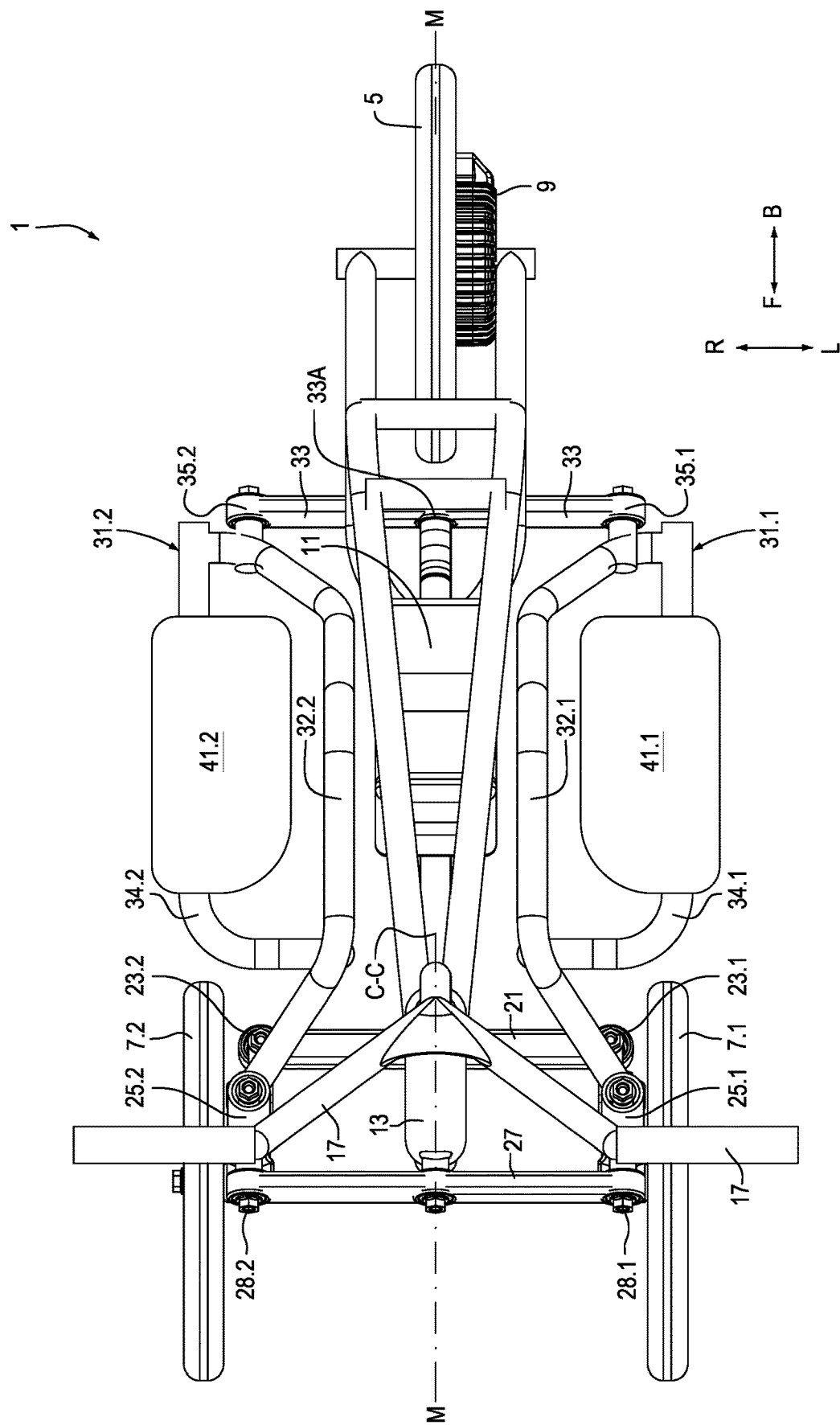
FIG. 2 shows a plan view according to II-II of FIG. 1.
Figure 3:
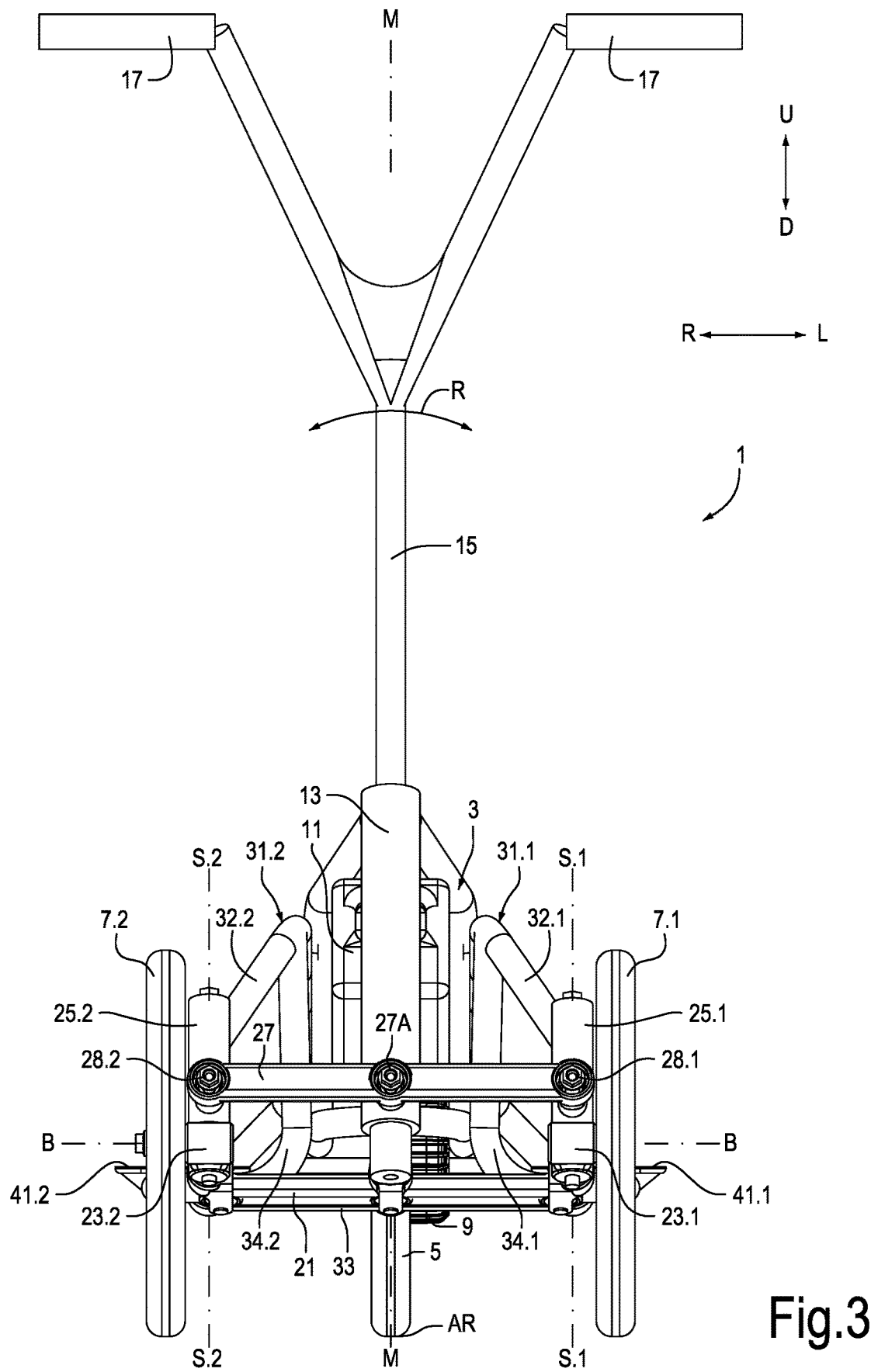
FIG. 3 shows a front view according to III-III of FIG. 1.
Figure 4:
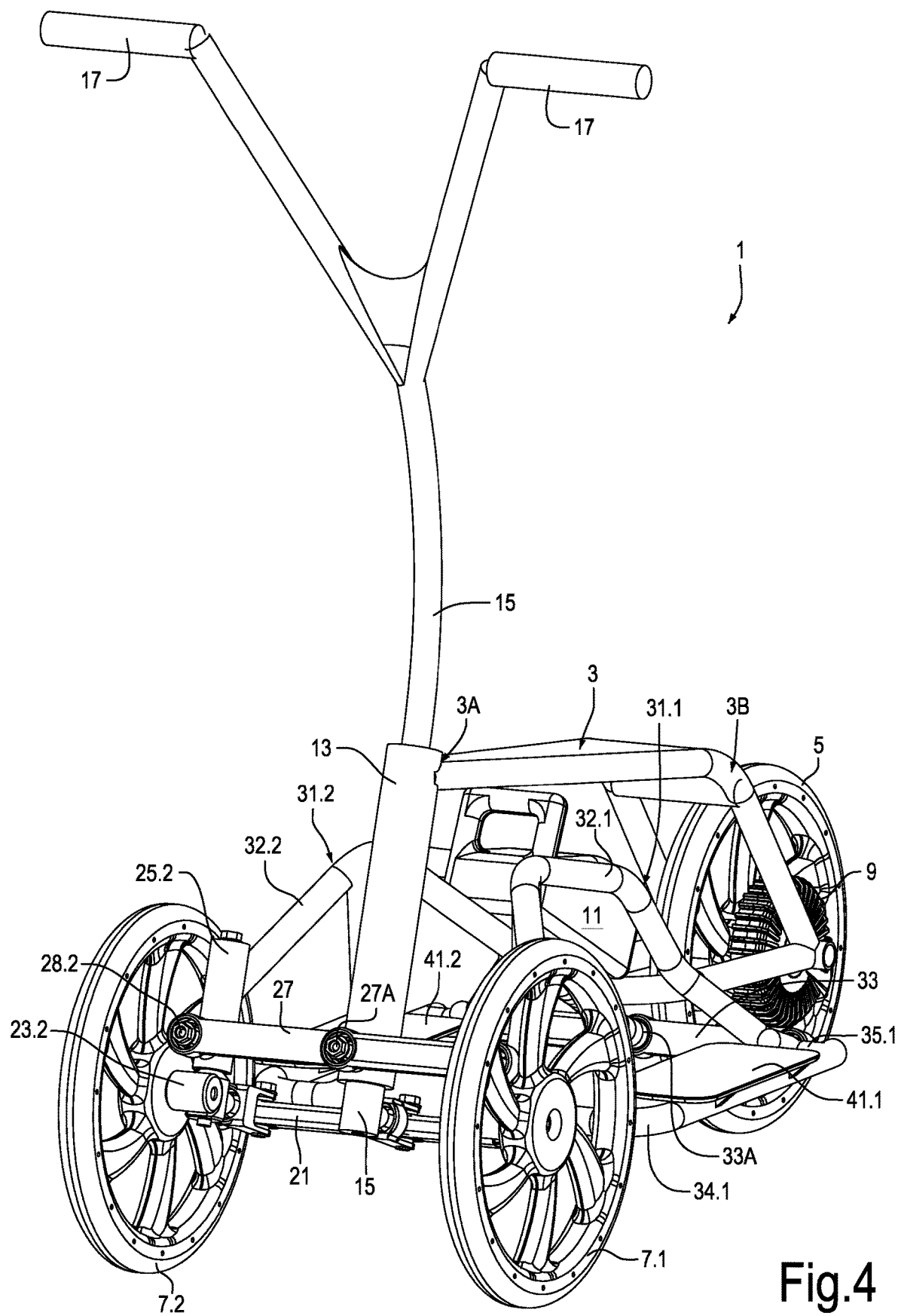
FIGS. 4 and 5 show two isometric views according to different angles of the vehicle of FIGS. 1, 2 and 3.
Figure 5:
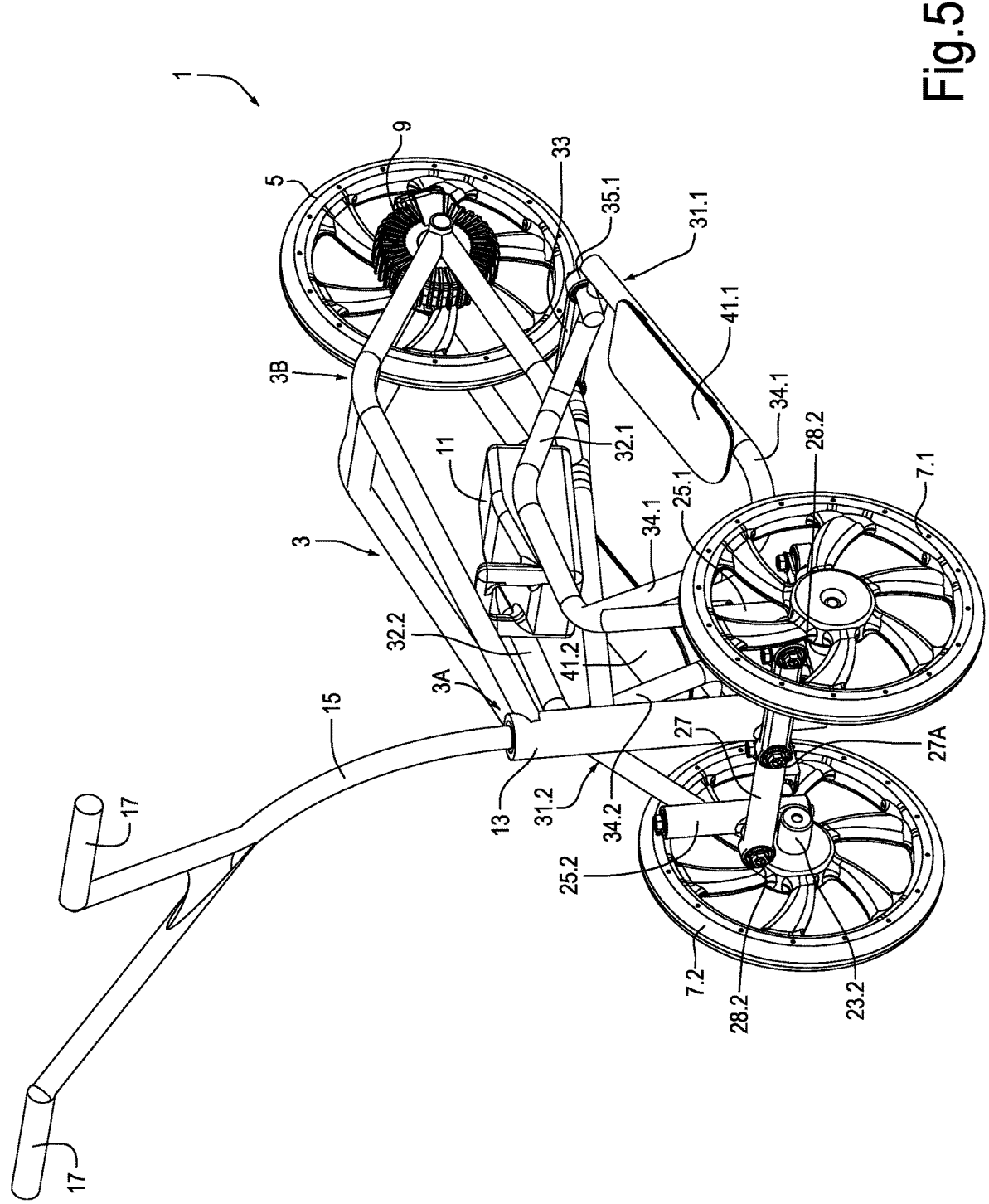
Figure 6:
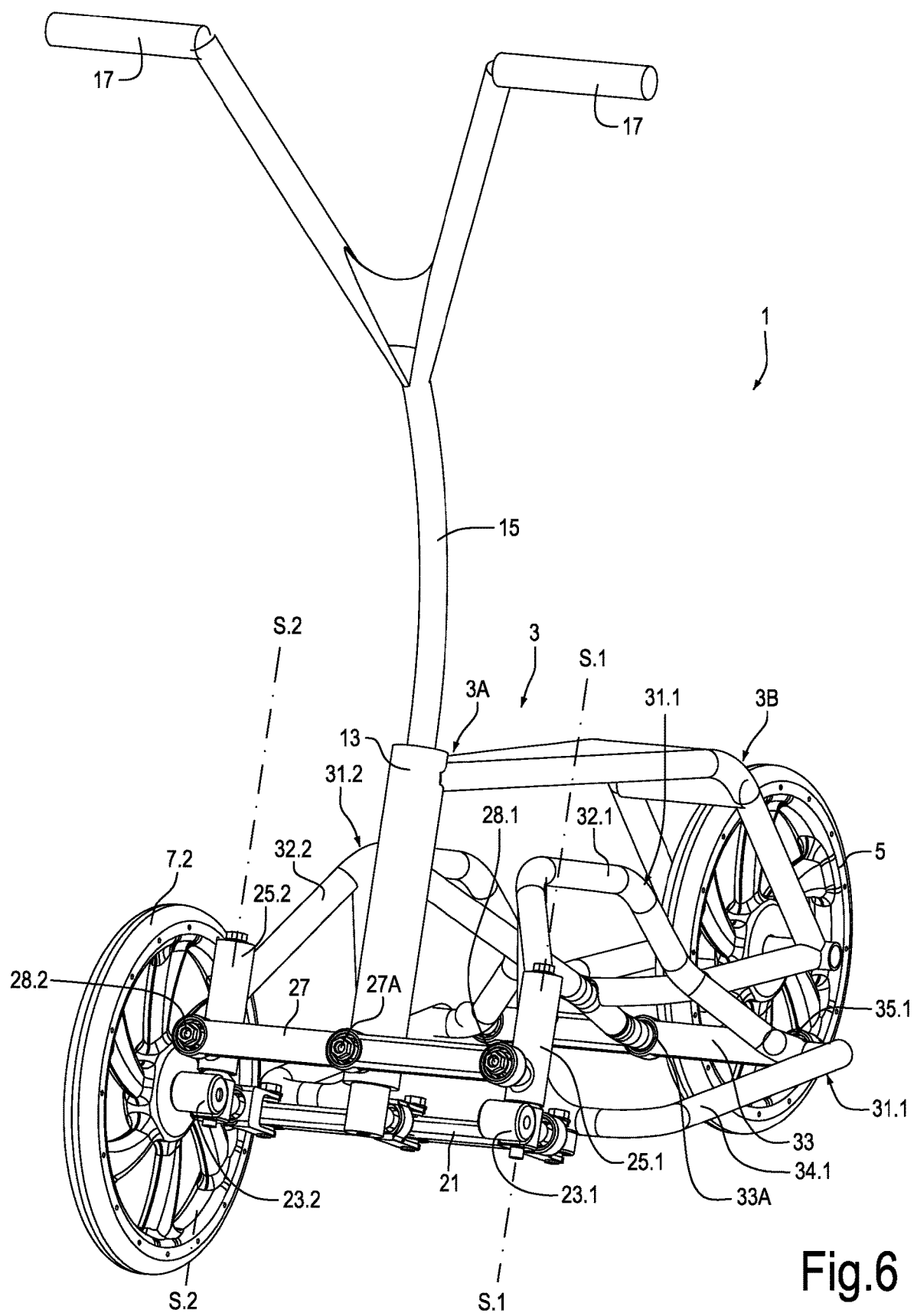
FIGS. 6 and 7 show isometric views of the vehicle of FIGS. 1 to 5 with the left wheel removed.
Figure 7:
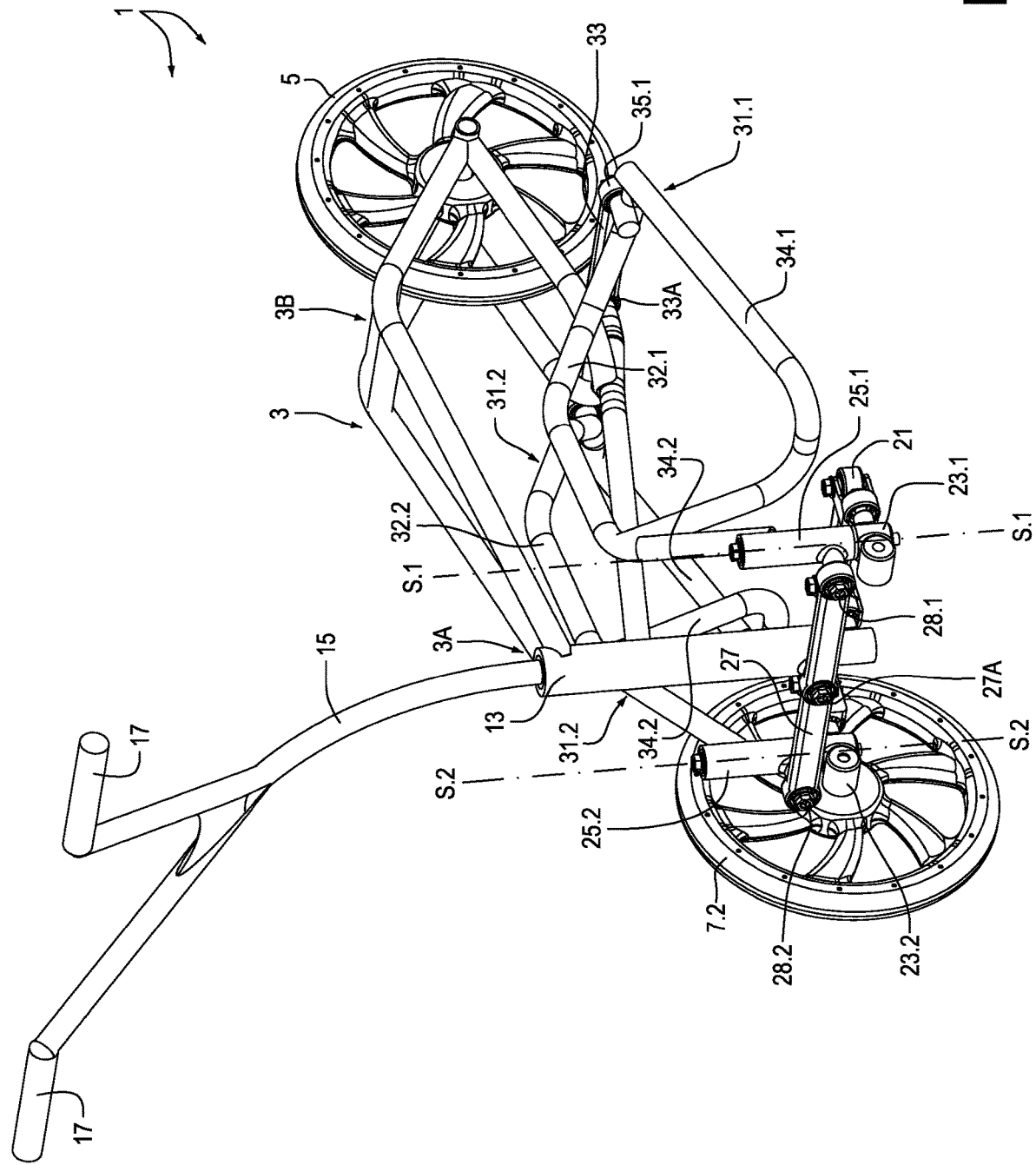
Figure 8:
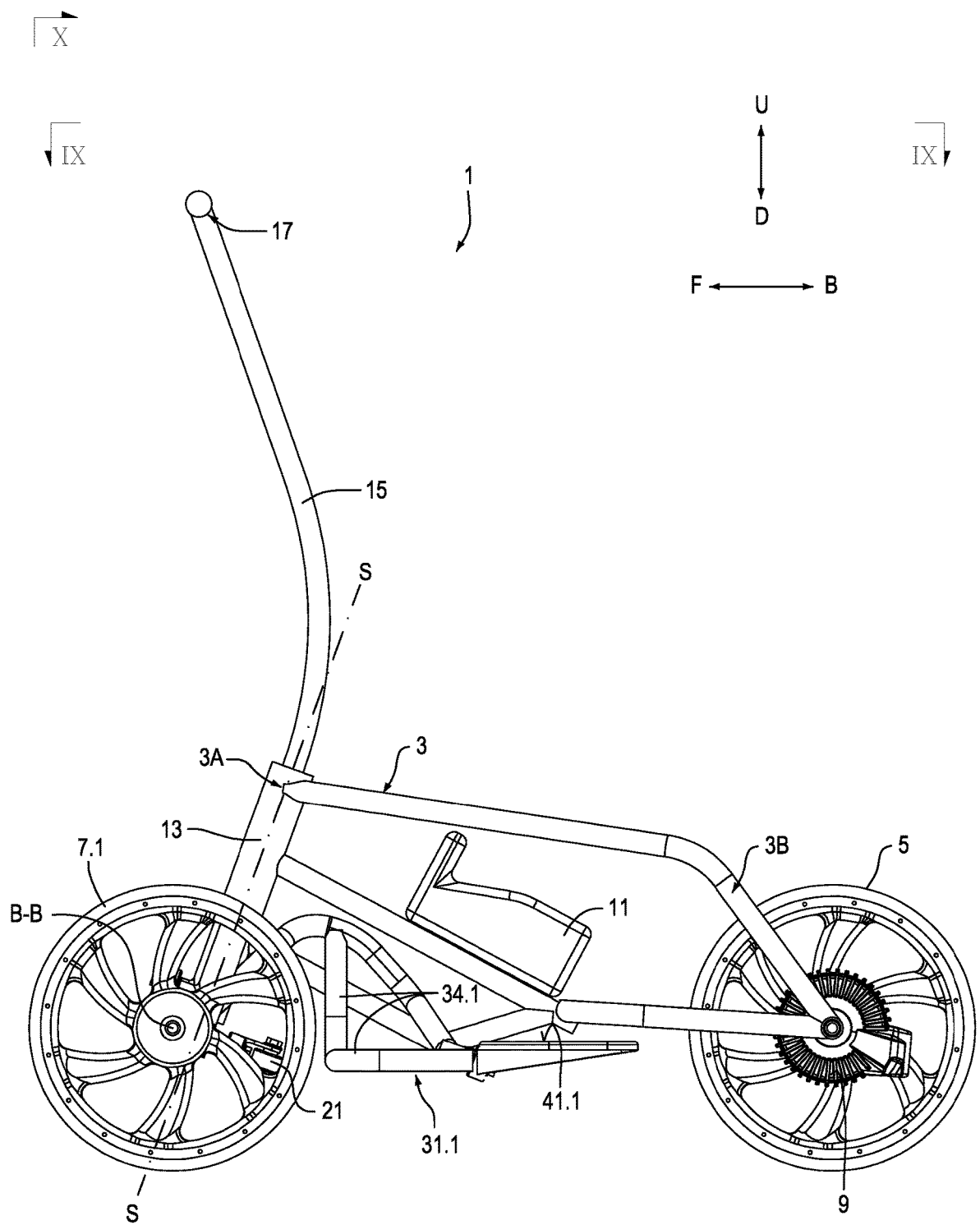
FIG. 8 show a schematic side view of a vehicle in a second embodiment.
Figure 9:
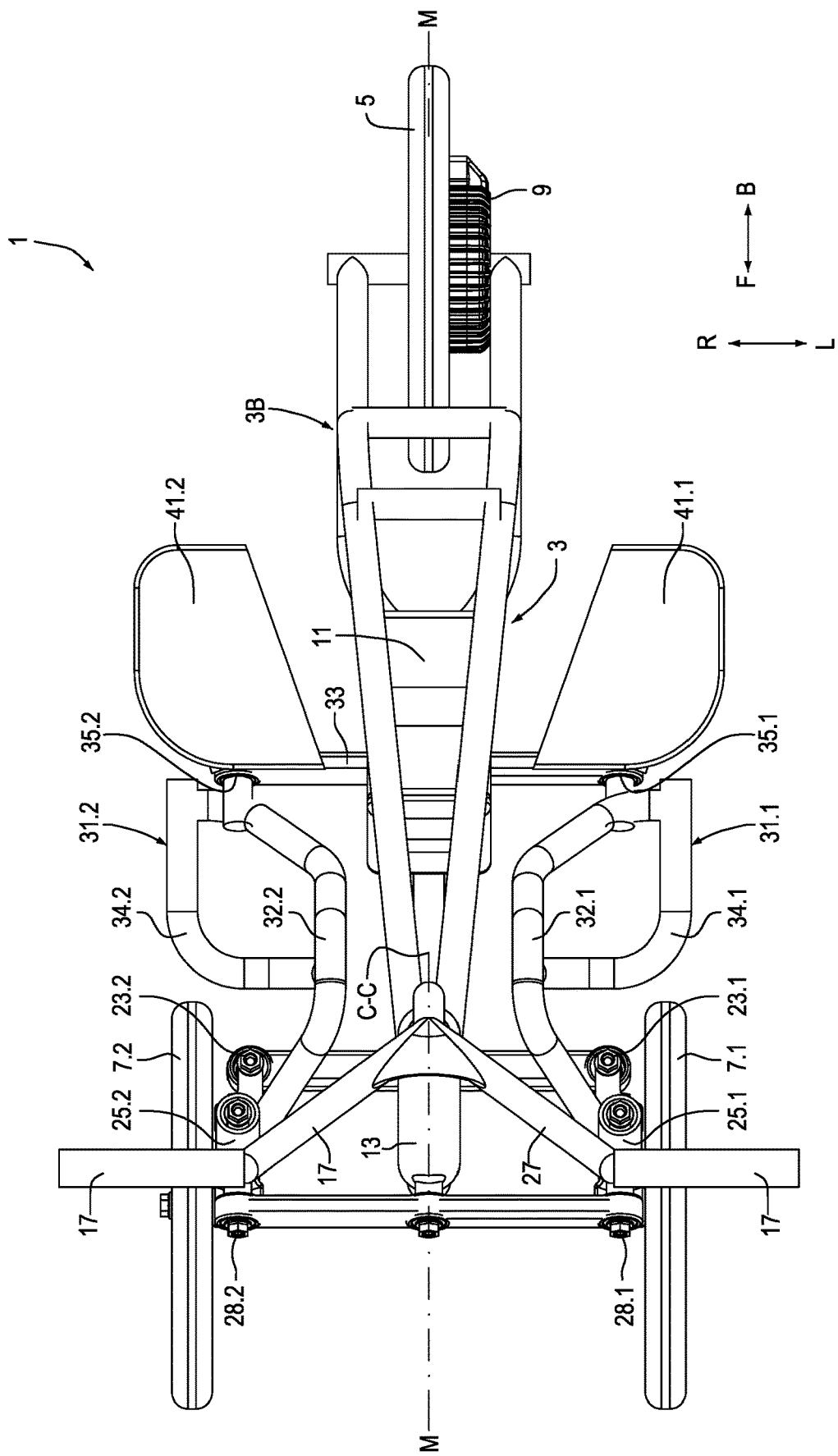
FIG. 9 show a plan view according to IX-IX of FIG. 8.
Figure 10:
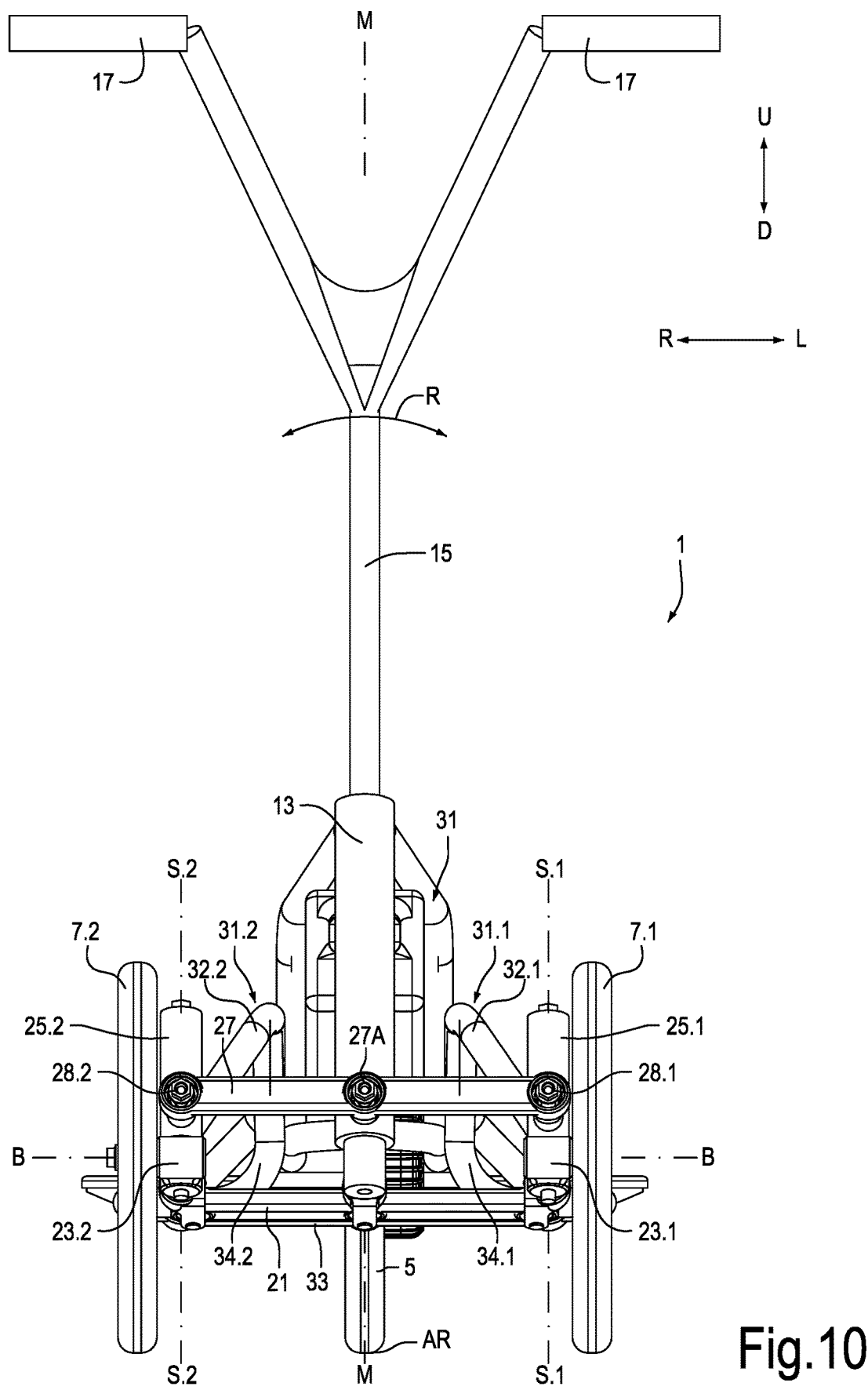
FIG. 10 show a front view according to X-X of FIG. 8.
Figure 11:
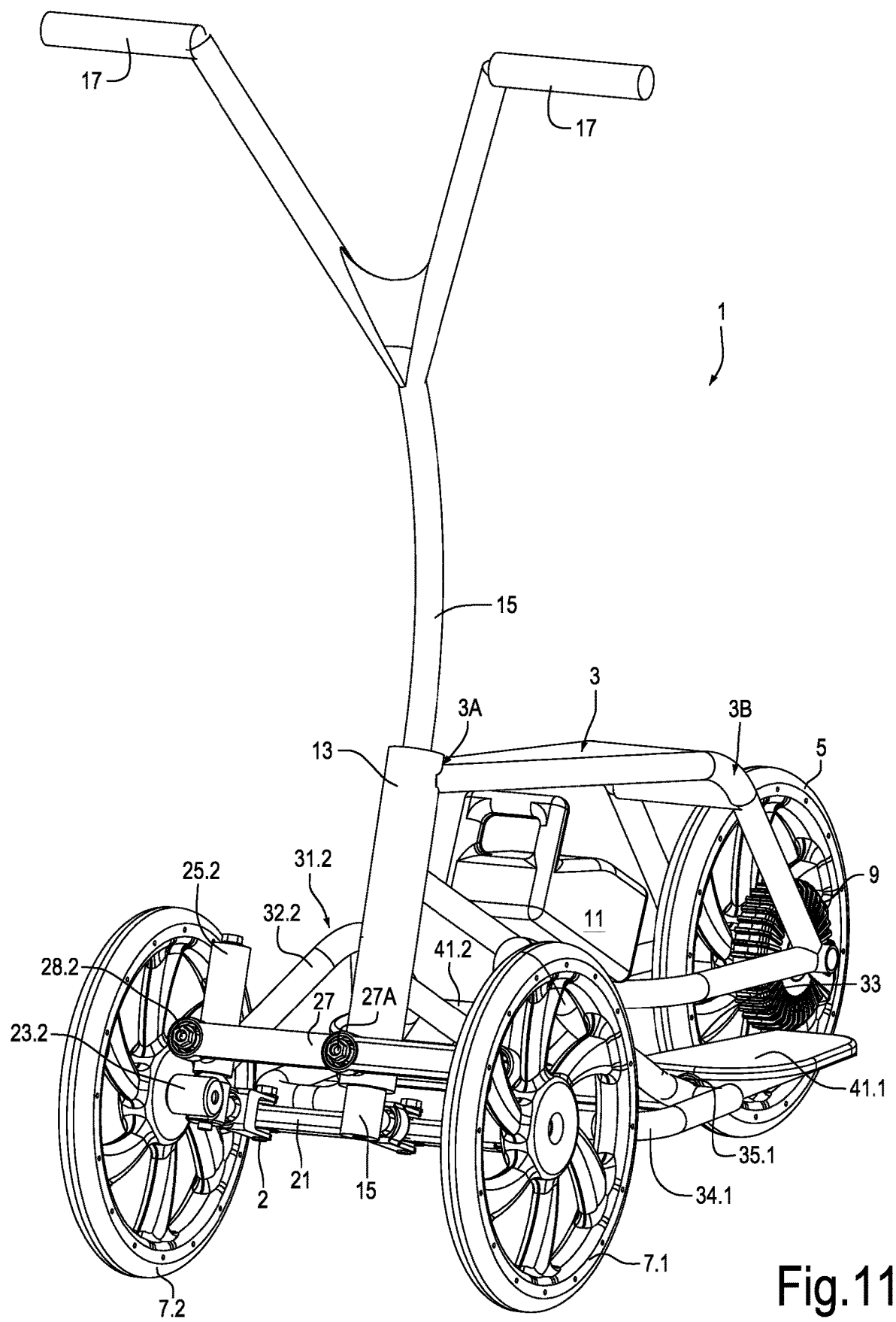
FIGS. 11 and 12 show two isometric views according to different angles of the vehicle of FIGS. 8 to 10.
Figure 12:
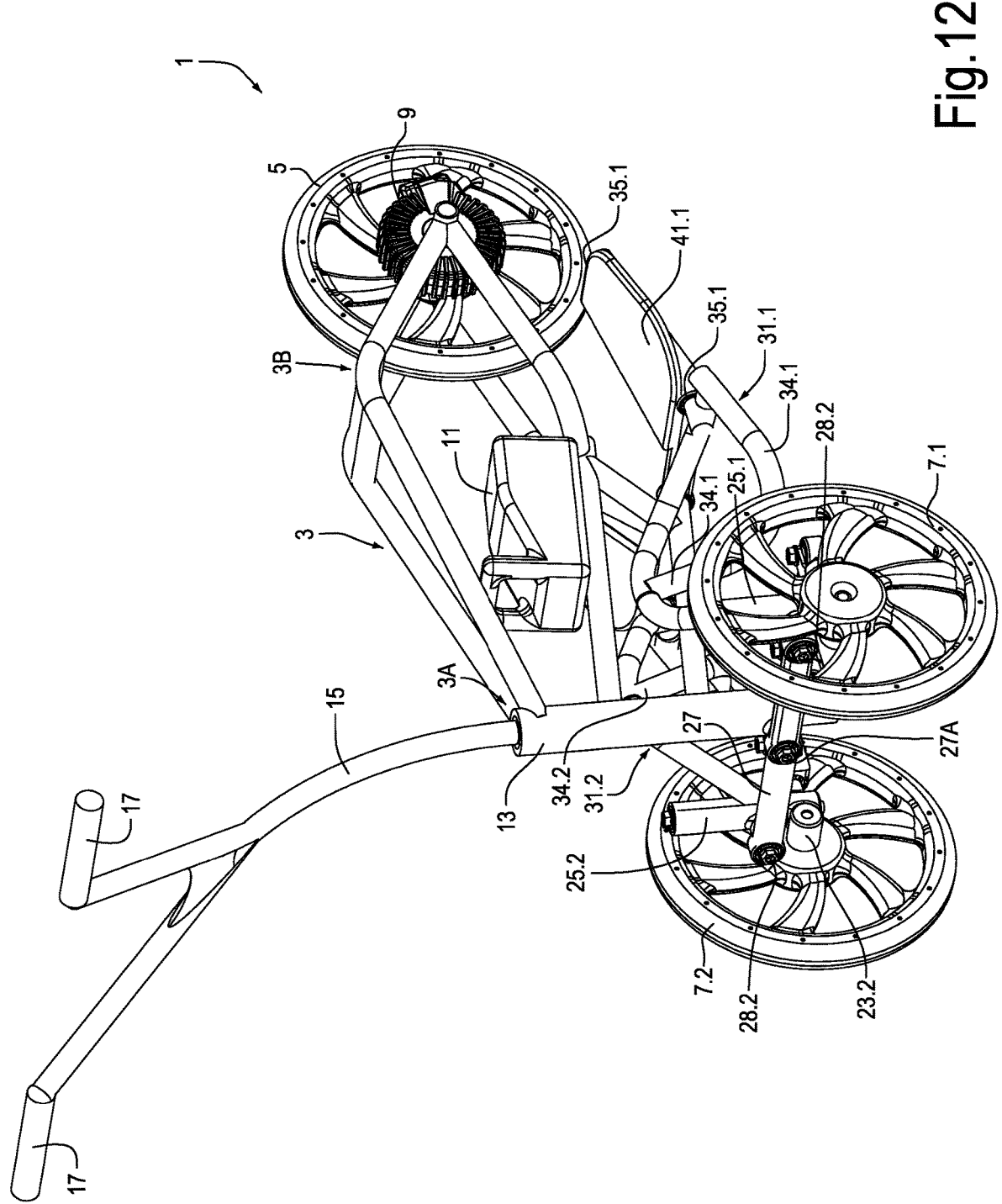

In FIGS. 1, 2 and 3 the arrows F-B indicate the front-rear direction of the vehicle, wherein F indicates the normal forward direction of travel of the vehicle. The arrows L-R indicate a left-right direction of the vehicle, with respect to a median plane M-M. The arrows U-D indicate a top-bottom vertical direction with respect to the normal attitude of the vehicle.

The vehicle is indicated as a whole with 1 and has a frame 3 with a front part (front end) 3A and a rear part (rear end) 3B. A rear driving wheel 5 is supported in the rear area of the frame 3, while the front end 3A is provided with two front steered wheels, and more precisely with a left front steered wheel 7.1 and a right front steered wheel 7.2. In the present description, elements symmetrically present on the left and right side of the vehicle 1 are generally indicated with the same reference number followed by "0.1" for elements on the left of the median plane M-M and by "0.2" for elements on the right of the median plane.

The vehicle 1 can be motorized. Although the use of internal combustion engines is not excluded, in advantageous embodiments the vehicle 1 has an electric motor, as shown schematically in the drawing. Reference number 9 indicates an electric motor and reference number 11 indicates a battery pack. The electric motor 9 can be coaxial to the rear driving wheel 5, as shown in the drawing, although other configurations, with a transmission system from the electric motor to the axis of the rear driving wheel, are also possible. In a further variant the vehicle 1 can have no motor and be used, for example, as a kick scooter and consequently pushed along by the driver.

A steering tube 13, into which a steering column 15, integral with a handlebar 17, is rotatably inserted, is fixed in the front part of the frame 3. The reference S-S indicates the rotation axis of the steering column 15. The driver controls the steering movement of the front steered wheels 7.1, 7.2 by means of the handlebar 17, which also forms an element for supporting the driver, while standing on the vehicle, as will be clarified below.

The front steered wheels 7.1, 7.2 are connected to the steering column 15 via a steering bar 21. The two opposite right and left ends of the steering bar 21 are hinged to supports 23.1 and 23.2 which are rotatable around respective steering axes S.1 of the left front steered wheel 7.1 and S.2 of the right front steered wheel 7.2. Reference B-B indicates the rotation axes of the front steered wheels 7.1, 7.2. These axes are coincident with each other when the vehicle 1 is in a vertical attitude, with a zero roll angle (vehicle at 900 with respect to the ground) and zero steering angle, as represented in FIGS. 1, 2 and 3.

In the illustrated embodiment, the supports 23.1 and 23.2 of the front steered wheels 7.1 and 7.2 are rotatably housed in tubular elements 25.1 and 25.2, with axes coincident with the steering axes S.1 and S2, respectively. The tubular elements 25.1 and 25.2 are hinged to a front crosspiece 27, which is in turn hinged with a hinge 27A to the frame 3, so as to be able to rotate around an axis C-C almost horizontal and lying on the median plane M-M. The reference numbers 28.1 and 28.2 indicate the hinges for connecting the ends of the front crosspiece 27 to the tubular elements 25.1 and 25.2, respectively. The axes of the hinges 28.1 and 28.2 are substantially parallel to the axis of the hinge 27A, with which the front crosspiece 27 is rotatably connected to the frame 3. In neutral attitude of the vehicle, i.e., in vertical attitude (zero roll angle) and wheels not steered, the axes of the hinges 28.1 and 28.2 and of the hinge 27A are parallel to the median plane M-M of the vehicle. The axis of the hinge 27A lies on said plane.

The crosspiece 27 is placed at a height such as to be arranged between the two front steered wheels 7.1, 7.2. In other words, the diameter of the front steered wheels 7.1, 7.2 can be larger than the distance of the crosspiece 27 from the surface on which the vehicle 1 is resting. This allows the use of wheels of larger sizes than those used in prior art vehicles, making the vehicle 1 easier to handle and more stable.

The tubular elements 25.1 and 25.2 are part of two respective rocker arms, respectively a left rocker arm 31.1 and a right rocker arm 31.2, of a four-bar linkage, of which the front crosspiece 27 forms one of the connecting rods.

Each rocker arm 31.1 and 31.2 is hinged directly to the single front crosspiece 27 by means of the abovementioned hinges 28.1 and 28.2. Moreover, each rocker arm 31.1 and 31.2 is hinged to a rear crosspiece 33, which forms the second connecting rod of the four-bar linkage. Therefore, the rocker arms 31.1 and 31.2 represent the uprights of the four-bar linkage. Consequently, the four-bar linkage is defined by the single front crosspiece 27, by the rear crosspiece 33 and by the uprights, which are the rocker arms 31.1 and 31.2. More in particular, the rocker arm 31.1 is hinged to a left end of the rear crosspiece 33 via a hinge 35.1, while the right rocker arm 31.2 is hinged to a right end of the rear crosspiece 33 via a hinge 35.2. The rear crosspiece 33 is centrally hinged to the frame 3 (visible in particular in FIGS. 4 and 6) via a hinge 33A. The hinges 35.1, 35.2 and 33A have hinge axes parallel to one another and to the axes of the hinges 28.1, 28.2, 27A.

The four-bar linkage formed by the connecting rods or crosspieces 27, 33 and by the rocker arms 31.1, 31.2 forms the tilting four-bar linkage of the vehicle 1. As can be seen in the drawings, the hinges 28.1, 28.2, 35.1, 35.2 of the four-bar linkage are not coplanar, but are on two planes spaced apart from each other in the front-rear direction F-B of the vehicle. The hinges 28.1, 28.2 are positioned farther forward and higher than the hinges 35.1, 35.2.

In a detailed constructional aspect, the hinges 28.1, 28.2, 35.1, 35.2 of the four-bar linkage are all inclined by a predetermined angle, for example measured between the axes S1 and S2 and the respective hinge axis 28.1, 28.2, said angle being the same for all the tilting hinges of the four-bar linkage. Therefore, the hinges 28.1, 28.2, 35.1, 35.2 of the four-bar linkage are all parallel to one another. This configuration allows the functionality of the four-bar linkage to be maintained and also allows the overall dimensions in height of the four-bar linkage, measured as the difference in level or height between the front crosspiece (at a higher level) and the rear crosspiece (at a lower level), to be limited. In this way, the four-bar linkage has a reduced or substantially coplanar height.

In the embodiment illustrated in FIGS. 1 to 7, two footboards 41.1 and 41.2 are rigidly connected to the two rocker arms 31.1, 31.2. The footboards are configured for supporting respectively the left foot and right foot of a driver who drives the vehicle 1 standing and holding onto the handlebar 17. Therefore, in the present invention, the footboards 41.1 and 41.2 are associated with the uprights of the four-bar linkage, i.e. with the rocker arms 31.1, 31.2. Instead, in the solutions according to the prior art, the footboards are associated with one of the crosspieces, in particular the lower crosspiece. In this case, when the vehicle tilts, the footboards remain parallel with the ground, i.e., do not follow the tilting movement. Differently, in the present invention, as the footboards are mounted integral with, i.e. fixed to, the respective rocker arms, fixed, when the vehicle tilts the footboards tilt according to an angle corresponding to the roll angle, as will also be described below.

Advantageously, in the embodiment illustrated in FIGS. 1 to 7 the rocker arms 31.1 and 31.2 have a shaped bar indicated with 32.1 and 32.2, respectively. In a plan view the two shaped bars 32.1 and 32.2 are closer to the median plane M-M of the vehicle than the footboards 41.1 and 41.2, see FIG. 2. In a side view (FIG. 1) the two shaped bars 32.1 and 32.2 are at a higher level than the footboards 41.1 and 41.2. The shaped bars 32.1 and 32.2 form bars for supporting the driver's legs. More in particular, the left and right calves of a driver standing on the footboards 41.1 and 41.2 can rest on the shaped bars 32.1 and 32.2.

In practical embodiments, each shaped bar 32.1, 32.2 forms an upside-down U, rigidly connected to the respective tubular element 25.1, 25.2 and connected to the rear crosspiece 33 by means of the respective rear hinge 35.1, 35.2. A further shaped bar 34.1, 34.2 rigidly connected to the respective shaped bar 32.1, 32.2 forms the fixing element of the respective platform 41.1, 41.2.

The vehicle described above allows left and right tilting movements around an axis contained in the median plane M-M and positioned at the level of the ground on which the vehicle 1 rests via the wheels 5, 7.1 and 7.2. In FIG. 3 the tilting movement is indicated by the double arrow R, while AR indicates the line of the roll axis orthogonal to the plane of FIG. 3. The tilting movement can be imparted to the vehicle 1 during driving by the driver shifting the weight on the footboards 41.1 and 41.2 and, at least partly, on the bars 32.1 and 32.2, if present and if used by the driver.

When traveling around a bend to the left, for example, the driver will shift the weight toward the intrados of the bend, i.e., will place more weight on the left footboard 41.1 and via the right calf will place part of the weight on the right bar 32.2. This will cause the vehicle to perform a tilting movement toward the inside of the bend, i.e., in this case tilting to the left around the roll axis AR. Vice versa, when traveling around a bend to the right, the driver will place more weight on the right footboard 41.2 and via the left calf will place part of the weight on the left bar 32.1. This will cause the vehicle to tilt to the right around the roll axis AR.

The aforesaid tilting movement is permitted by the deformation of the four-bar linkage formed by the front 27 and rear 33 crosspieces, or connecting rods, and by the rocker arms 31.1 and 31.2. A front four-bar linkage with two crosspieces hinged to the front end, as is instead provided in prior art vehicles, is not necessary.

In the embodiment described above and illustrated in FIGS. 1 to 7, the footboards 41.1 and 41.2, which support the driver's feet, are rigidly connected to the rocker arms 31.1 and 31.2, respectively, and therefore follow the movement thereof. Nonetheless, this is not necessary. FIGS. 8 to 12 show an embodiment in which the footboards, which support the driver's feet, are mounted in a different manner.

In FIGS. 8 to 12 the same reference numbers indicate the same parts already described with reference to FIGS. 1 to 7 or parts equivalent thereto. These parts shall not be described again. The main difference between the embodiment of FIGS. 1 to 7 and the embodiment of FIGS. 8 to 12 consists in that in the latter embodiment the footboards, once again indicated with 41.1 and 41.2, are rigidly fixed to the rear crosspiece 33. To allow a correct position of the footboards 41.1, 41.2 with respect to the handlebar 17, the rocker arms 31.1 and 31.2 are shorter in the front-rear direction (F-B). The bars supporting the driver's legs are not present, as in this case the legs are positioned behind the rocker arms 31.1 and 31.2.

Consequently, the footboards 41.1 and 41.2 remain in an approximately horizontal attitude when the vehicle 1 performs a tilting movement around the roll axis AR, while in the embodiment of FIGS. 1 to 7 tilting of the footboards 41.1 and 41.2 follows the movement of the vehicle 1 and therefore they tilt with respect to the horizontal by an angle equal to the roll angle.

The invention claimed is:

1. A vehicle comprising:
a frame;
at least one rear driving wheel supported by the frame;
a tilting four-bar linkage comprising: a left rocker arm; a right rocker arm; a single front crosspiece, which extends in a left-right direction of the vehicle, centrally hinged to the frame, and having a left end hinged directly to the left rocker arm and a right end hinged directly to the right rocker arm; and a rear crosspiece, centrally hinged to the frame;
a left front steered wheel supported by the left rocker arm so as to rotate around a left steering axis; and
a right front steered wheel supported by the right rocker arm so as to rotate around a right steering axis;
a steering column, rotatably housed in a steering tube; wherein the steering tube is rigidly connected to the frame; and wherein the steering column is connected to a handlebar and, via a steering linkage, to the left front steered wheel and to the right front steered wheel; and
a left footboard supported by the rear crosspiece and the left rocker arm; and
a right footboard supported by the rear crosspiece and the right rocker arm.

2. The vehicle of claim 1, wherein the left footboard is arranged in an intermediate position between the front crosspiece and the rear crosspiece; and wherein the right footboard is arranged in an intermediate position between the front crosspiece and the rear crosspiece.

3. The vehicle of claim 2, wherein the left footboard is rigidly connected to the left rocker arm and the right footboard is rigidly connected to the right rocker arm.

4. The vehicle of claim 1, wherein the left footboard and the right footboard are rigidly connected to the rear crosspiece.

5. The vehicle of claim 1, wherein a left bar configured to support a left leg of a driver is rigidly connected to the left footboard, and a right bar configured to support a right leg of the driver is rigidly connected to the right footboard; wherein the left bar and the right bar are arranged at a higher level than the respective left footboard and right footboard; and wherein the left bar is positioned closer than the left footboard to a median plane of the vehicle and the right bar is positioned closer than the right footboard to the median plane of the vehicle.

6. The vehicle of claim 1, wherein the front crosspiece is positioned in an intermediate position between the left front steered wheel and the right front steered wheel, and hinged to the frame around an axis placed at a height smaller than a diameter of the left front steered wheel and of the right front steered wheel.

7. The vehicle of claim 1, wherein the steering linkage connecting the steering column to the left front steered wheel and to the right front steered wheel comprises a steering bar placed behind a rotation axis of the steering column with respect to a forward direction of travel of the vehicle.

8. The vehicle of claim 1, further comprising an electric motor.

9. The vehicle of claim 8, wherein the electric motor is coaxial to the rear driving wheel.

10. The vehicle of claim 1, wherein: the left front steered wheel is rotatably supported around the left steering axis by means of a left support rotatably housed in a left tubular element rigidly connected to the left rocker arm; and the right front steered wheel is rotatably supported around the right steering axis by means of a right support rotatably housed in a right tubular element rigidly connected to the right rocker arm.

11. The vehicle of claim 1, wherein the left footboard and the right footboard are arranged behind the rear crosspiece in a front-rear direction of the vehicle.

* * * * *